US 8,000,992 B1
Aug. 16, 2011

(12) United States Patent
Marchbanks et al.

(54) SYSTEM AND METHOD FOR PROJECT MANAGEMENT PLAN WORKBOOK

(75) Inventors: Noel Marchbanks, Overland Park, KS (US); Steve B. Owens, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1027 days.

(21) Appl. No.: 11/833,555

(22) Filed: Aug. 3, 2007

(51) Int. Cl.
*G06Q 10/00* (2006.01)

(52) U.S. Cl. ............. 705/7.27; 705/7.12; 705/7.13; 705/7.23; 705/7.26; 705/7.28

(58) Field of Classification Search ......... 705/7.11–7.42
See application file for complete search history.

(56) References Cited

U.S. PATENT DOCUMENTS

| | | | |
|---|---|---|---|
| 5,303,170 A | 4/1994 | Valko | |
| 5,978,811 A | 11/1999 | Smiley | |
| 6,324,647 B1 | 11/2001 | Bowman-Amuah | |
| 6,327,698 B1 | 12/2001 | Kolluru | |
| 6,349,404 B1 | 2/2002 | Moore et al. | |
| 6,446,053 B1 | 9/2002 | Elliott | |
| 6,662,357 B1 | 12/2003 | Bowman-Amuah | |
| 6,920,458 B1 | 7/2005 | Chu et al. | |
| 7,051,036 B2 | 5/2006 | Rosnow et al. | |
| 7,058,588 B2 * | 6/2006 | Young et al. | 705/7.26 |
| 7,117,161 B2 | 10/2006 | Bruce | |
| 7,430,498 B2 | 9/2008 | Butterfield et al. | |
| 7,559,049 B1 | 7/2009 | Hemmat et al. | |
| 7,640,531 B1 | 12/2009 | Akram et al. | |
| 7,698,148 B2 | 4/2010 | Lavu et al. | |
| 7,730,123 B1 | 6/2010 | Erickson et al. | |
| 7,818,288 B1 | 10/2010 | Dickson et al. | |
| 7,890,545 B1 | 2/2011 | Cason, Jr. et al. | |
| 7,908,167 B1 * | 3/2011 | Crum et al. | 705/7.42 |
| 2001/0041999 A1 * | 11/2001 | Young et al. | 705/8 |
| 2002/0026630 A1 | 2/2002 | Schmidt et al. | |
| 2002/0042731 A1 | 4/2002 | King, Jr. et al. | |
| 2002/0059512 A1 | 5/2002 | Desjardins | |
| 2002/0073078 A1 | 6/2002 | Ku et al. | |
| 2002/0082904 A1 | 6/2002 | Grosshart et al. | |
| 2003/0033191 A1 | 2/2003 | Davies et al. | |
| 2003/0065663 A1 | 4/2003 | Chu | |
| 2003/0106039 A1 * | 6/2003 | Rosnow et al. | 717/100 |
| 2003/0110067 A1 * | 6/2003 | Miller et al. | 705/8 |
| 2003/0208367 A1 | 11/2003 | Aizenbud-Reshef et al. | |
| 2004/0030992 A1 * | 2/2004 | Moisa et al. | 715/513 |
| 2004/0054565 A1 | 3/2004 | Nemecek et al. | |
| 2004/0059589 A1 | 3/2004 | Moore et al. | |
| 2004/0143811 A1 | 7/2004 | Kaelicke et al. | |

(Continued)

OTHER PUBLICATIONS

Barkley "Integrated Project Management" (2006) McGraw-Hill Companies, Inc.*

(Continued)

*Primary Examiner* — Lynda C Jasmin
*Assistant Examiner* — Sujay Koneru (57) ABSTRACT

A computer implemented method for a plan workbook is provided that comprises recording charter-scope data, management structure data, planning and control data, and supporting plans in the plan workbook for project management. The management structure data is based on the charter-scope data and comprises project management role data that identities individuals associated with the project management. The planning and control data is based on the management structure data and comprises a work breakdown structure (WBS). The supporting plans data is based on the planning and control data and comprises risk register data and variance report data. The method also comprises promoting project management by displaying the plan workbook.

19 Claims, 8 Drawing Sheets

U.S. PATENT DOCUMENTS

| | | | |
|---|---|---|---|
| 2005/0027582 | A1 | 2/2005 | Chereau et al. |
| 2005/0033725 | A1 | 2/2005 | Potter et al. |
| 2005/0060213 | A1 | 3/2005 | Lavu et al. |
| 2005/0114829 | A1 | 5/2005 | Robin et al. |
| 2005/0149370 | A1* | 7/2005 | Brown .............................. 705/8 |
| 2005/0197845 | A1* | 9/2005 | Wachter et al. ................... 705/1 |
| 2005/0197952 | A1 | 9/2005 | Shea et al. |
| 2005/0216111 | A1* | 9/2005 | Ooshima et al. ................ 700/99 |
| 2005/0251525 | A1 | 11/2005 | Chu et al. |
| 2006/0053043 | A1* | 3/2006 | Clarke .............................. 705/8 |
| 2006/0095309 | A1 | 5/2006 | Mangan et al. |
| 2006/0095906 | A1 | 5/2006 | Oikawa |
| 2006/0184371 | A1 | 8/2006 | Tsalakopoulos |
| 2006/0190391 | A1 | 8/2006 | Cullen, III et al. |
| 2006/0206368 | A1 | 9/2006 | Bamberger et al. |
| 2007/0038490 | A1 | 2/2007 | Joodi |
| 2007/0276674 | A1 | 11/2007 | Hemmat |
| 2007/0299707 | A1 | 12/2007 | Bentsen et al. |
| 2008/0313008 | A1* | 12/2008 | Lee et al. ........................ 705/10 |
| 2008/0313596 | A1 | 12/2008 | Kreamer et al. |
| 2009/0055237 | A1* | 2/2009 | Henry et al. ...................... 705/8 |

OTHER PUBLICATIONS

Mentz et al. "Project Management Guide" (Nov. 2005) American Academy of Project Management.*

Dickson, Thomas S., et al., "ETOM Enhancement of Functional Requirements Modeling," U.S. Appl. No. 11/491,435, filed Jul. 21, 2006.

Cassone, Deandra, et al., "Risk Management in Project Management," U.S. Appl. No. 11/833,544, filed Aug. 3, 2007.

"eTOM Overview", TM Forum—Technical Programs, http://wwwtmforum.org/browse.asp?, Jan. 2006, pp. 1-2.

Gordijn, Jaap, et al., "e3-value : Design and Evaluation of e-Business Models," IEEE Intelligent Systems, Special Issue on Intelligent e-Business, Apr. 2001.

Hillson, David, "Using a Risk Breakdown Structure in Project Management," Research Paper, Mar. 2003, Henry Stewart Publications 1472-5967, Journal of Facilities Management, vol. 2, No. 1, pp. 85-97.

International Telecommunication Union (ITU-T), "Series M: TMN and Network Maintenance: International Transmission Systems, Telephone Circuits, Telegraphy, Facsimile and Leased Circuits; Telecommunications Management Network, Enhanced Telecom Operations Map (eTOM)—The Business Process Framework," Jun. 2004.

Markovits, Shmuel, et al., "Information Modeling of Trouble: A Service Provider View," 8th International Conference on Telecommunications—ConTEL 2005.

Milham, Dave, et al., "How Can the eTOM® Framework Help Service Providers in Today's Marketplace?," Telecom Italia, Torino, Italy, 2004.

Pateli, Adamantia, "A Framework for Understanding and Analysing eBusiness Models," 16th Bled eCommerce Conference, eTransformation, Bled, Slovenia, Jun. 9-11, 2003.

Project Management Institute, "A Guide to the Project Management Body of Knowledge Third Edition (PMBOK® Guide)," Project Management Institute, Inc., Newtown Square, Pennsylvania, 2004.

Smith, Dennis, et al., "A Roadmap for Enterprise Integration," IEEE Computer Society, Proceedings of the 10th International Workshop on Software Technology and Engineering Practice (STEP '02), 2002.

Office Action dated Jun. 20, 2008, U.S. Appl. No. 11/491,435.

Final Office Action dated Nov. 14, 2008, U.S. Appl. No. 11/491,435.

Advisory Action dated Feb. 2, 2009, U.S. Appl. No. 11/491,435.

Office Action dated Apr. 24, 2009, U.S. Appl. No. 11/491,435.

Notice of Allowance dated Jun. 29, 2010, U.S. Appl. No. 11/491,435.

Office Action dated Aug. 25, 2010, U.S. Appl. No. 11/833,544.

Zhu, Kevin, "Project Pipeline Risk Management," U.S. Appl. No. 12/348,731, filed Jan. 5, 2009.

Final Office Action dated Dec. 9, 2010, U.S. Appl. No. 11/833,544.

"A Comprehensive, best-practices approach to business resilience and risk mitigation." IBM Governance and Risk Management, Sep. 2007.

"IT Governance—Value for the Business," Project Challenge Expo, Sep. 19-20, 2007, London.

"An Introduction to Project Management," Cultural Consortium Ltd., 2005.

Shenkir, William G., et al., "Enterprise Risk Management: Tools and Techniques for Effective Implementation," Institute of Management Accountants, 2007.

Somers, Toni M., et al., "The Impact of Critical Success Factors across the Stages of Enterprise Resource Planning Implementation," Proceedings of the 34th Hawaii International Conference on System Sciences, 2001.

Walker, Mike, "Integration of Enterprise Architecture and Application Portfolio Management," http://msdn.microsoft.com/en-us/library/bb896054(d=printer).aspx, Oct. 2007.

Notice of Allowance dated Apr. 15, 2011, U.S. Appl. No. 11/833,544.

* cited by examiner

SYSTEM AND METHOD FOR PROJECT MANAGEMENT PLAN WORKBOOK

CROSS-REFERENCE TO RELATED APPLICATIONS

This application includes subject matter related to U.S. patent application Ser. No. 11/833,544, filed Aug. 3, 2007, entitled "Risk Management in Project Management," by Deandra Cassone et al., which is herein incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Project management may be a complicated task involving a large amount of project management data and various groups of people. The project management data may be related to project scope, project management structure, project planning and control, and project plan support, among others. The project management data may be interdependent. For example, some of the project scope data may depend on some of the management structure data.

SUMMARY

In an embodiment, a computer implemented method for a plan workbook is provided that comprises recording charter-scope data, management structure data, planning and control data, and supporting plans in the plan workbook for project management. The management structure data is based on the charter-scope data and comprises project management role data that identifies individuals associated with the project management. The planning and control data is based on the management structure data and comprise a work breakdown structure (WBS). The supporting plans data is based on the planning and control data and comprises risk register data and variance report data. The method also comprises promoting project management by displaying the plan workbook.

In another embodiment, a system for a plan workbook is provided that comprises a storage device, a processor, and an input-output device. The input-output device is used to record charter-scope data and management structure data in the plan workbook for a project. The management structure data comprises project management role data that identifies individuals associated with the project management. The input-output device is also used to record planning and control data and supporting plans data in the plan workbook. The planning and control data comprise a work breakdown structure. The supporting plans data comprises risk register data and variance report data. The storage device contains instructions, such that the instructions when executed by the processor are configured to promote project management for the project by displaying the plan workbook.

In yet another embodiment, a computer implemented method for using a plan workbook for project management is provided that comprises initiating the plan workbook using a plan workbook template, consulting a plurality of current plan workbooks, consulting a plurality of previous plan workbooks, promoting project management by reusing one or more of data fields from the plurality of the current plan workbooks, and promoting the project management by reusing one or more of data fields from the plurality of the previous plan workbooks. The plan workbook template include template data fields for charter-goal data, management structure data, planning and control data, and supporting plan data. The management structure data comprise project management role data that identifies individuals associated with the project management. The planning and control data comprises a work breakdown structure (WBS), and the supporting plan data comprises risk register and variance report.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Project management may be a complicated task involving a large amount of data of various types and various groups of people. The project management data may be related to project scope, project management structure, project planning and control, and project supporting plan, among others. One standard approach to management of project management data is based on the Project Management Institute's *A*

*Guide to the Project Management Body of Knowledge (PM-BOK® Guide)*. Newtown Square, Pa.: Project Management Institute, Inc., c2004, 3$^{rd}$ Edition. HD69.P75 G845 2004, which is incorporated herein by reference for all purposes. This approach addresses mapping a project to a set of functional domains, which may be included in project management processes.

The embodiments of the present disclosure provide a plan workbook or a project management tool for project management that consolidates a large amount of project management data into one place and provides a structural sequence to reflect the sequence of the project management activities. The plan workbook organizes the large amount of the project management data of diverse types into a hierarchical structure that may comprise a root, a number of data areas under the root, a number of data fields under a data area, a number of data items under a data field, and a number of data contents under a data item.

The plan workbook may provide unidirectional or bidirectional links to allow a user to traverse forward and backward among the plan workbook data. The plan workbook may also provide a link to a data content outside the plan workbook such as a file, a web page, a file folder or a database. The plan workbook may provide a data template to promote a uniform representation of diverse types of project management data. The template may include data fields specific to this project management tool. The data fields specific to this project management tool may include the project management role data that identifies those who are at least one of responsible, accountable, consulted and informed (RACI) or otherwise related to project deliverables, and a work breakdown structure (WBS) that provides a hierarchical decomposition of work to be accomplished. The data fields specific to this project management tool may also include a risk register that may comprise impact severity data, probability data, and exposure data for each identified risk, and a variance report that may comprise plan data, actual data, and comparison data for projected time and projected cost. The plan workbook captures the how-to knowledge about project management and promotes uniform, consistent, and repeatable project management practices across multiple projects.

Figure 1:
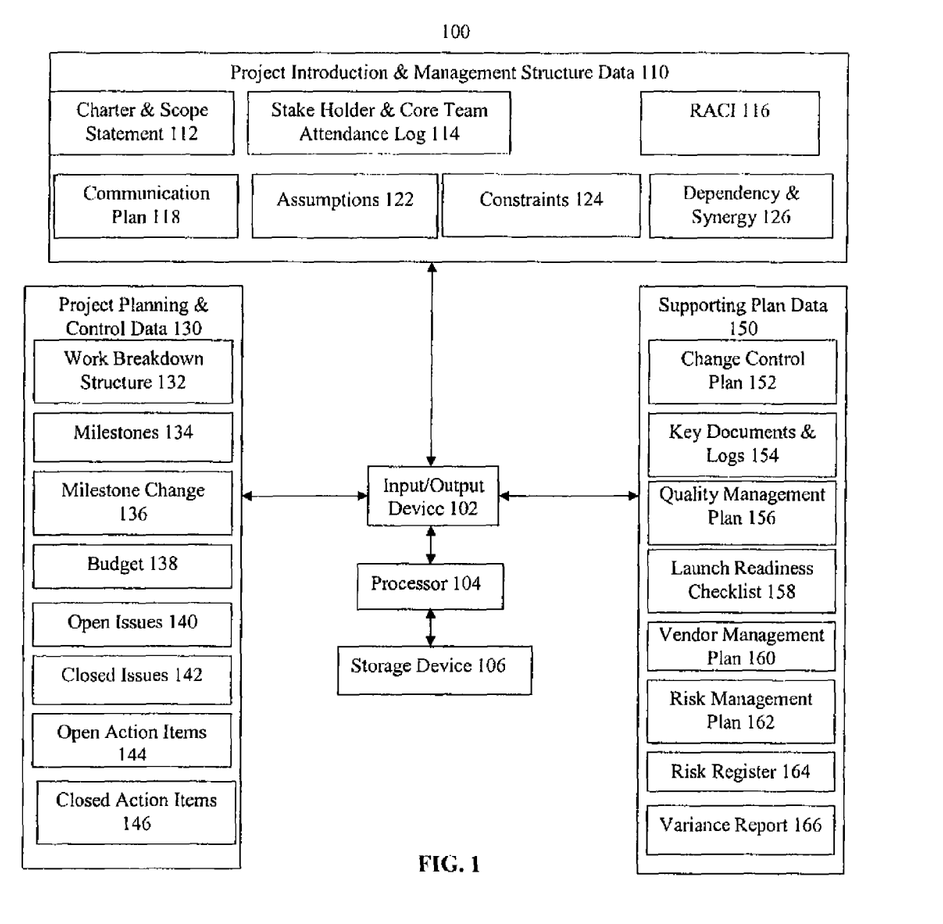
FIG. 1 illustrates a plan workbook system according to some embodiments of the present disclosure.

FIG. 1 illustrates a project plan workbook system 100 according to some embodiments of the present disclosure. The project plan workbook system 100 includes one or more input/output devices 102 that may input project data, a processor 104 that can process the project data, and a storage device 106 that can store the project data. The input-output devices 102 may be used by a user to enter data manually or to import data from another data source such as a spreadsheet. The input device 102 may have a user interface (UI) (not shown) for data entry and for data display. The storage device 106 may implement a database using a relational database, object-oriented database, and other current or future database technologies.

Figure 3:
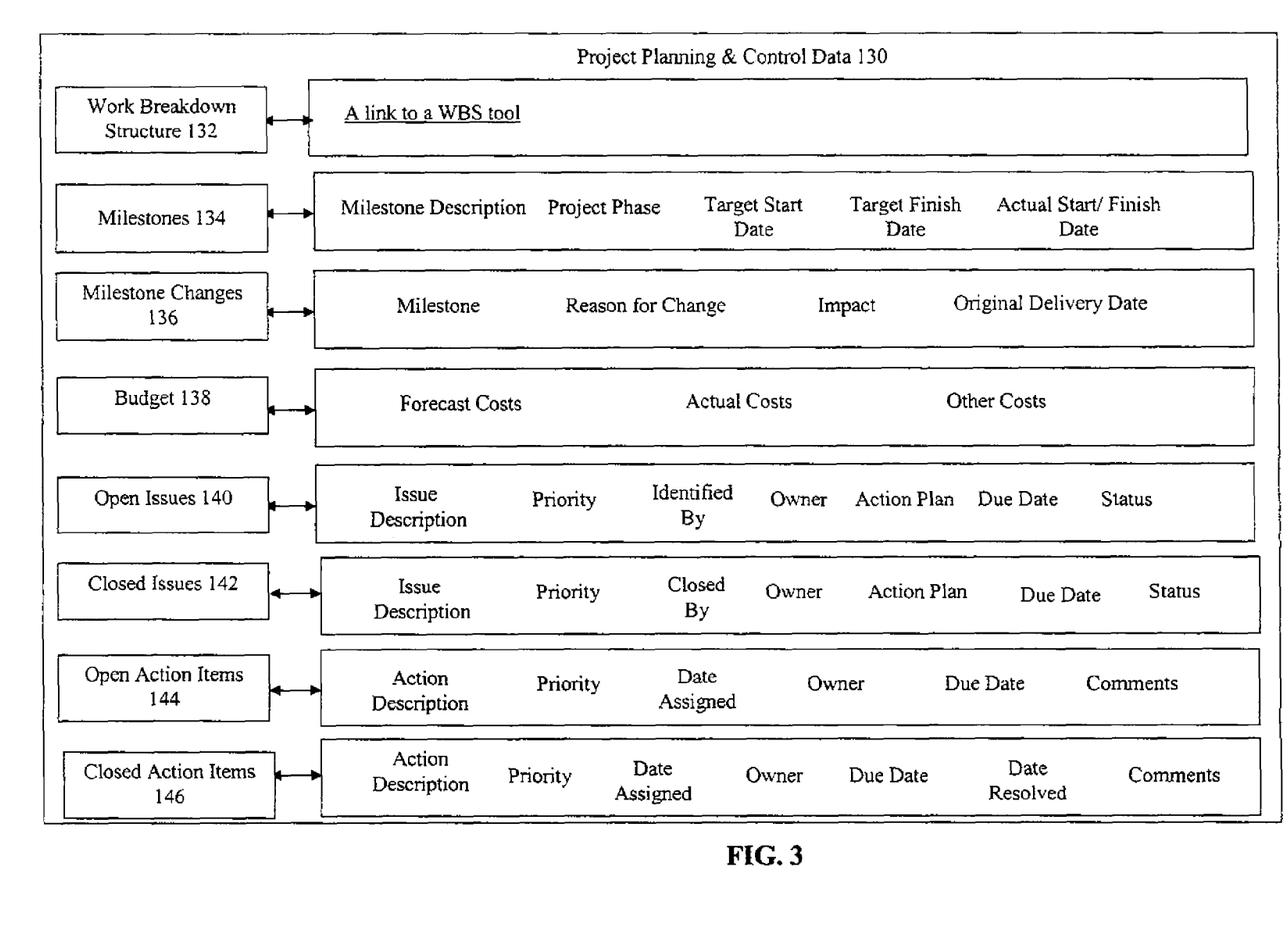
FIG. 3 illustrates a block diagram of a project planning and control data display according to some embodiments of the present disclosure.
Figure 4:
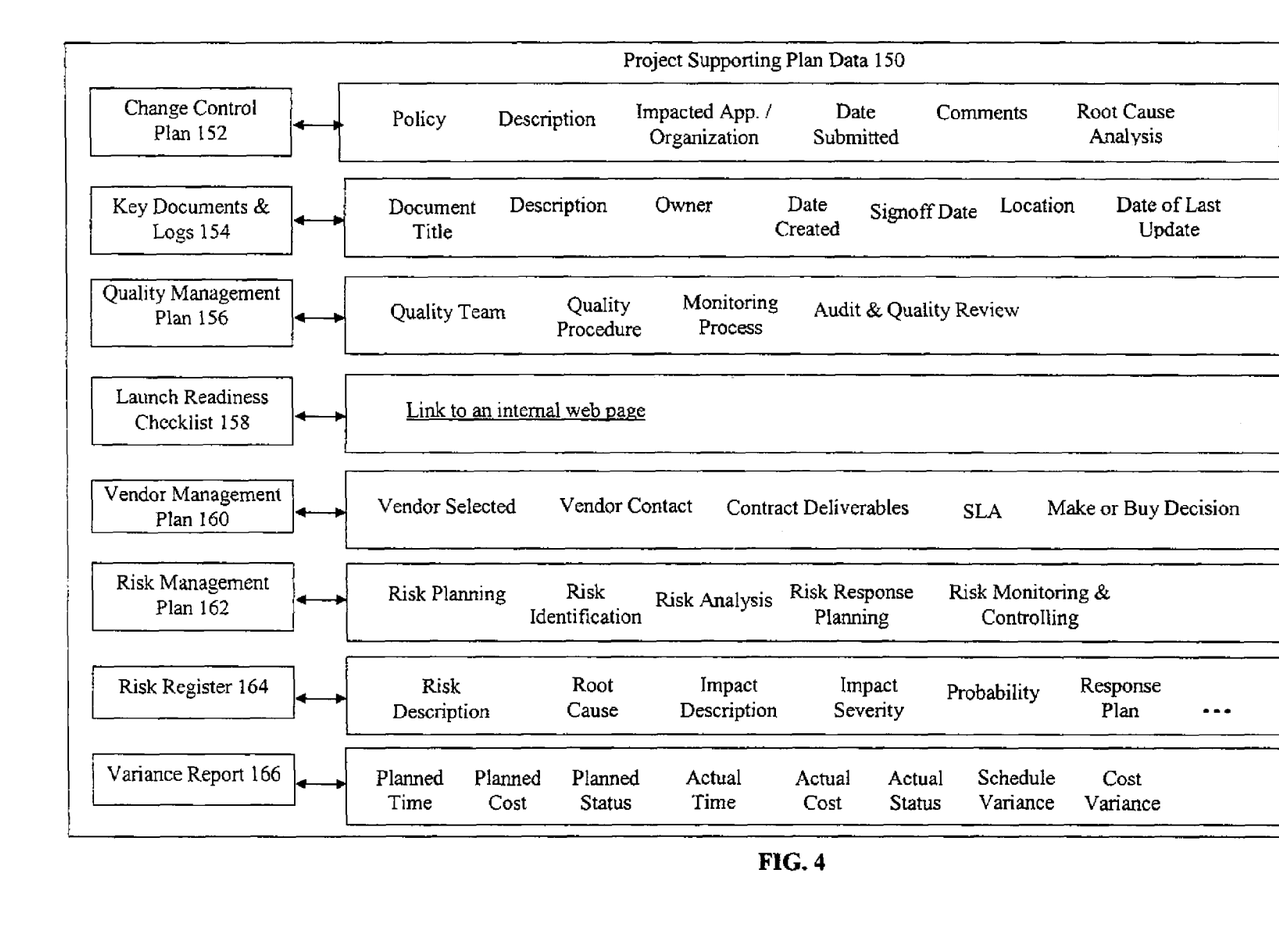
FIG. 4 illustrates a block diagram of a project supporting plan data display according to some embodiments of the present disclosure.

The system 100 may be associated with any amount or types of project data. For the illustrative example in FIG. 1, the system 100 includes project introduction and management structure data 110, project planning and control data 130, and project supporting plan data 150. The project introduction and management structure data 110, the project planning and control data 130, and the project supporting plan data 150 are depicted in FIG. 2 through FIG. 4 and are described hereinafter.

Figure 8:
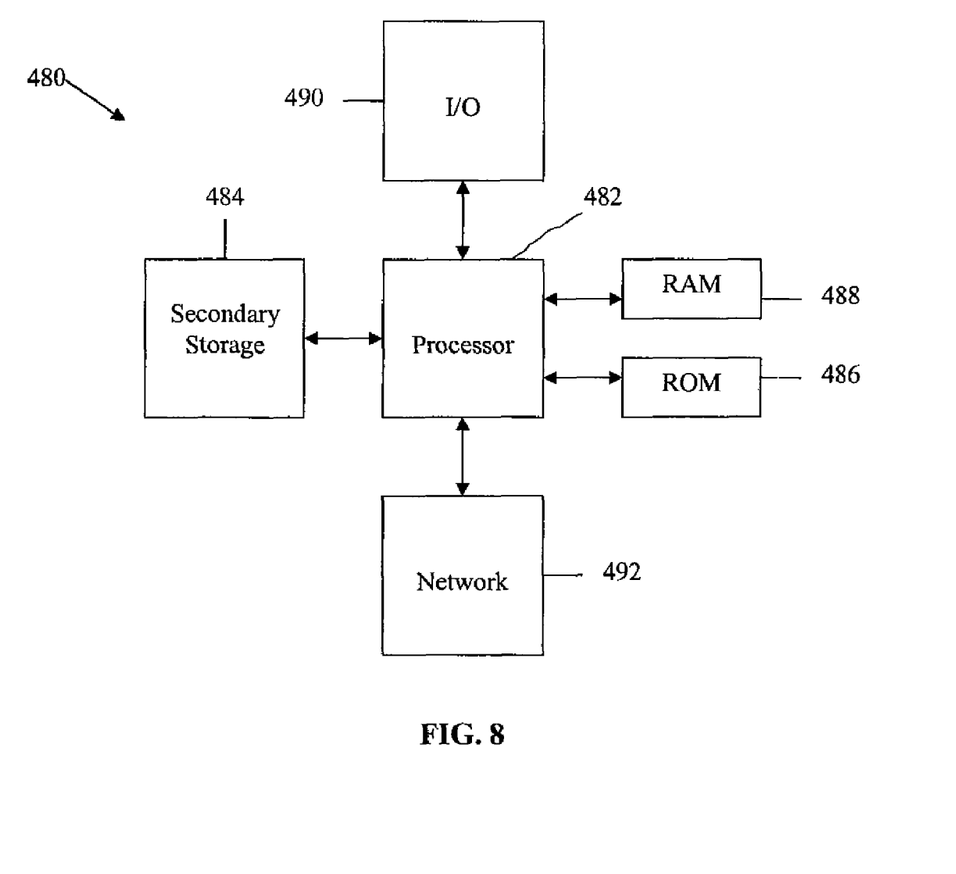
FIG. 8 illustrates an exemplary general purpose computer system suitable for implementing the several embodiments of the disclosure.

The project introduction and management structure data 110 may include data fields related to setting the goals and the scope of the project such as project charter and scope statement 112, and the data fields related to project management structure such as a stake holder and core team attendance log 114, a project management role data RACI 116, a communication plan 118, one or more assumptions 122, one or more constraints 124, and dependency and synergy 126. Similarly, the planning and control data 130 may include data fields such as work breakdown structure (WBS) 132, milestones 134, milestone changes 136, budget 138, open issues 140, closed issues 142, open action items 144, and closed action items 146. The project supporting plan data 150 may include various plan data fields in support of the project management, such as change control plan 152, key documents and logs 154, quality management plan 156, launch readiness checklist 158, vendor management plan 160, risk management plan 162, risk register 164, and variance report 166. The system 100 may be implemented on a general purpose computer which is depicted in FIG. 8 and described hereinafter. In some embodiments, the plan workbook may be implemented, at least in part, as a spreadsheet or a customized spreadsheet, for example using MICROSOFT EXCEL. In some other embodiments, the plan workbook may be implemented, at least in part, as a JAVA application or a web-based application.

Figure 2:
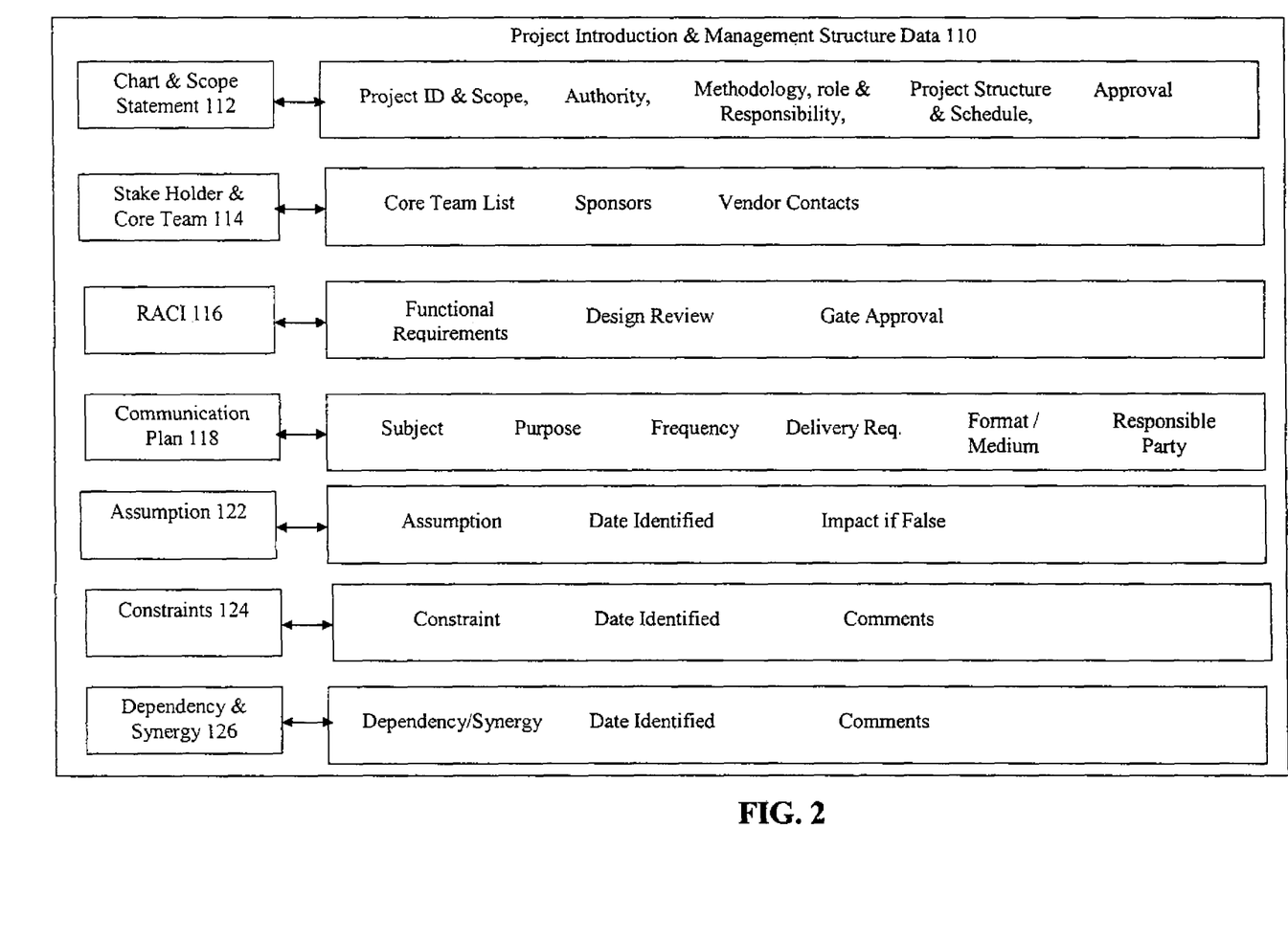
FIG. 2 illustrates a block diagram of a project introduction and management structure data display according to some embodiments of the present disclosure.

FIG. 2 shows a block diagram of the project introduction and management structure data 110, according to some embodiments of the present disclosure. The project introduction and management structure data 110 may have a number of data fields, and a data field in turn may have a number of data items. The data field project charter and scope statement 112 may be employed to formally launch a project and may have data items such as a project ID and a scope statement to specify scope of the project; an authority to identify an owner of the business requirements; and a methodology-role-responsibility to specify a standard project management process, a project team role, and project measurements. The project charter and scope statement 112 may also include data items such as a project structure and schedule data item to identify a project schedule document and project control process; and an approval data item to identify an authority to approve the project. The data field stake holder and core team 114 may include data items such as a core team list, one or more sponsors of the project, and one or more vendor contacts.

The data field RACI 116 may identify project management roles and responsibilities of the parties for each of the key deliverables of the project. The roles may include, for example, being responsible, accountable, consulted and informed on the key deliverables of the project. A party may play more than one of the roles for one or more project areas. The project areas may include functional requirement, design reviews, and project gate approval, among others. For example, a product manager may be responsible for delivering system requirements of a software project and may be accountable for project gate approval, but may only be informed on the design review. On the other hand, a development team manager may be responsible for the design review but may only be consulted on the project gate approval.

The data field communication plan 118 may determine and document the communication needs of the stakeholders and may include data items such as communication subject, purpose, frequency, delivery requirements of the communications, format and medium of the communications, a responsible party, and an audience. The data field assumptions 122 may identify potential assumptions for the project and may include data items such as an assumption description, a date when the assumption is identified, and an impact if the assumption turns out false, among others. The data field constraints 124 may identify specific project-related restrictions or limitations that may be internal or external to the project and may affect the process of the project or the performance of the project team. The data field constraints 124 may include data items such as a constraint description, a date the constraint is identified, and applicable comments or notes on the constraint. The data field dependency and synergy 126 may identify the items the project may depend on for its success and the interactions of two or more entities that may affect the progress of the project. The data field dependency and synergy 126 may include data items such as a dependency and synergy description, a date when the dependency and synergy are identified, and the comments or notes on the dependency and the synergy.

The plan workbook system 100 may provide links between a data field and the data items under the data field, as illustrated by the two-way arrow between the data field and the data items in FIG. 2. A link may take a user from the data field RACI 116, for example, to the data items included in the RACI such as responsible or accountable parties for the project design review. Another link may take the user from the data items back to the data field RACI 116.

FIG. 3 illustrates a block diagram of the project planning and control data 130 according to some embodiments of the present disclosure. The project planning and control data 130 may have a number of data fields, and a data field in turn may have a number of data items. The data field WBS 132 may decompose the total scope of the project into a hierarchical tree structure. For example, a node of the WBS tree may represent a task and its child nodes represent subtasks of the task. A subtask may be further decomposed into multiple sub-subtasks that may be represented by the child nodes of the child node. The task decomposition may proceed this way until each subtask can no longer be reasonably further decomposed. The data item of the data field WBS 132 may be a link to a WBS tool which may lead the user directly to a file or an application outside the plan workbook. The data field milestones 134 may identify major milestones such as completion of project requirements documentation, design walkthrough, and unit test verification. A milestone may include data items such as a milestone description, a project phase of the milestone, a target start date, a target finish date, an actual start date, and an actual finish date, among others.

The data field milestone changes 136 may document a milestone missed and the reason for the change, and may include the data items such as the milestone that is missed, reason for the change, impact of the change, and original delivery date, among others. The data field budget 138 may include the data items such as a forecast cost, an actual cost, and other costs, and may include one or more links to other document such as contract documents and budget documents. The data field open issues 140 may document open issues related to the project and may include data items such as issue description, priority, the party that identified the open issue, the owner of the open issue, an action plan on the open issue, a due date for an resolution of the open issue, and a current status.

The data field closed issues 142 may document the issues that have been closed and may have data items such as an issue description, a priority, an owner, a date for issue opening, and a date for issue closing. The data field open action items 144 may document the action items that are still open and may include data items such as an open action description, a priority of the action item, an owner of the action item, a date the action was assigned, a due date, and comments or notes. The data field closed action items 146 may document closed action items and may include data items such as a closed action description, a priority of the action item, an owner of the action item, a date assigned, a due date, a date the action is resolved, and comments or notes.

As in FIG. 2, the plan workbook system 100 may provide links between a data field and the data items included in the data field, as illustrated by the two-way arrow between the data field and the data items in FIG. 3. A link may take a user from the data field WBS 132, for example, to a WBS tool that is outside the plan workbook system 100.

FIG. 4 illustrates a block diagram of the project supporting plan data 150 according to some embodiments of the present disclosure. The project supporting plan data 150 may have a number of data fields, and a data field in turn may have a number of data items. The data field change control plan 152 may document procedures and processes on change requests related to the project and may include data items such as a policy for change request, a description of the change request, the applications and/or organization that would be impacted by the change, a date the change request is submitted, a status of the change request, and a root cause analysis for the change request. The data field key documents and logs 154 may identify documents that are important to the project and may be shared by multiple parties involved in the project. The data items may include a document title, a description of the document, an owner of the document, a date the document was created, a date the document was signed off, a location of the document, and a date of the last update.

The data field quality management plan 156 may document the aspects related to quality management for the project and may include data items such as a list of quality management team members, a procedure for quality management, a monitoring process, quality related audits and reviews, a project acceptance process, and a project quality metrics. The data field launch readiness check list 158 may identify a list of activities to be completed before launch of the project and may include a link to another document that may contain detailed check list items. The data field vendor management plan 160 may identify how procurement should be managed and may include data items such as vendors that are selected, vendor contact information, contract deliverables, a service level agreement, and a make or buy decision, among others.

The data field risk management plan 162 may specify risk management activities for the project and may include data items such as risk planning, risk identification, risk analysis, and risk monitoring and controlling, among others. The data field risk register 164 may function as a holding place for the output from the activities of the risk management plan 162 and may include data items such as a risk description, a root cause, an impact description, an impact severity, a risk probability, a risk response plan, and an action taken to mitigate the impact, among others. More detail on the project risk management and risk register can be found in related U.S. patent application Ser. No. 11/833,544, filed Aug. 3, 2007, entitled "Risk Management in Project Management," by Deandra Cassone et al., which was incorporated by reference above. The data field variance report 166 may provide project status related to schedule, schedule performance, cost and cost performance variance and may include the data items such as a planned time, a planned cost, a planned status, an actual time, an actual cost, an actual status, schedule variance, and cost variance, among others.

As in FIG. 2 and FIG. 3, the plan workbook system 100 may provide links between a data field and the data items included in the data field, as illustrated by the two-way arrow between the data field and the data items in FIG. 4. A link may take a user from the data field launch readiness checklist 132, for example, to a web page that is outside the plan workbook system 100 and is shared by multiple parties involved in the project.

Figure 5:
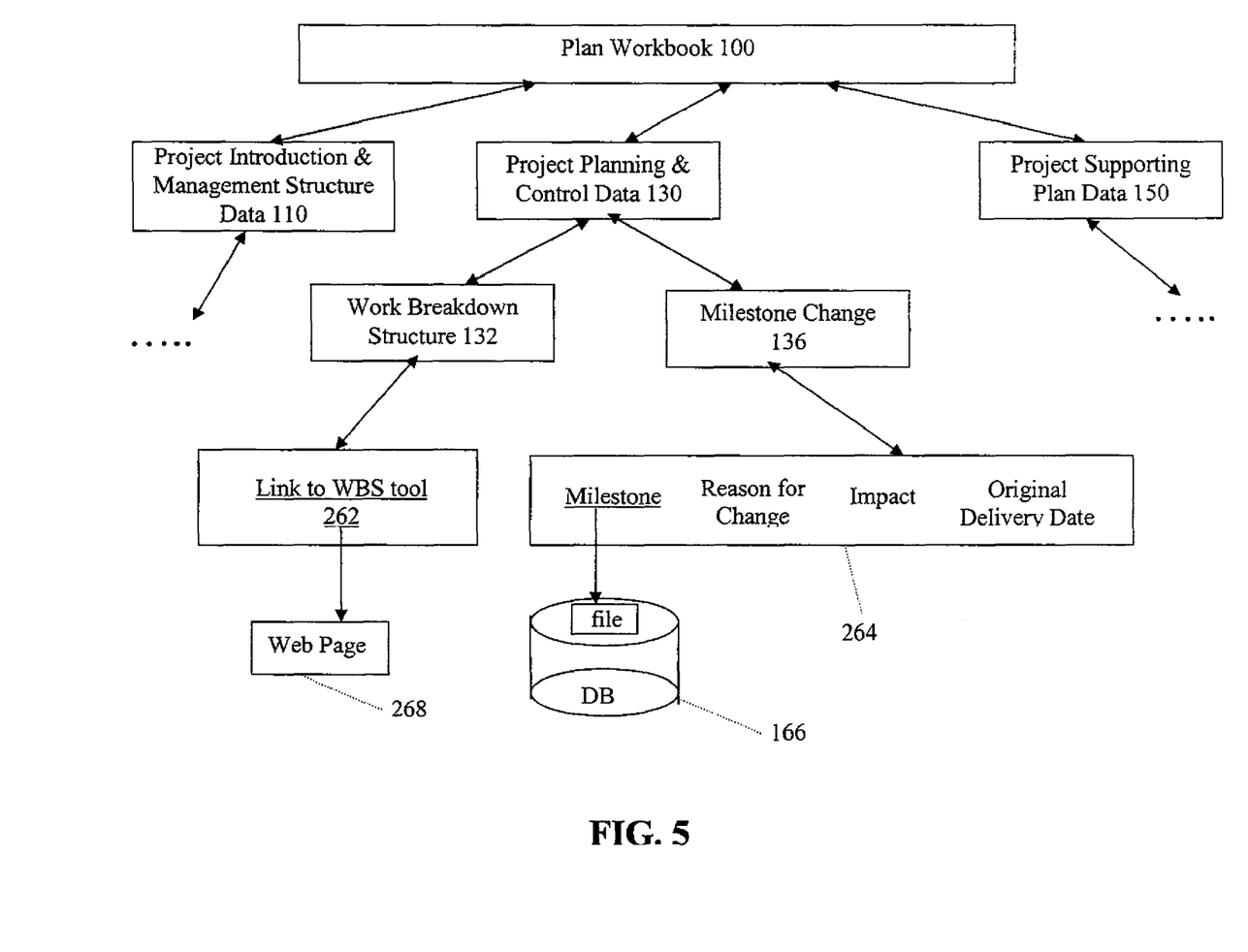
FIG. 5 illustrates a block diagram of a linked hierarchical structure of plan workbook data according to some embodiments of the present disclosure.

FIG. 5 illustrates a block diagram of a hierarchical structure of the plan workbook data. Large amounts of the plan workbook data may be organized into a hierarchical structure, and mechanisms may be provided to link data at one level of the hierarchy to the data at other levels of the hierarchy. In one embodiment, the plan workbook may have a five-level hierarchy. At the root is the plan workbook and at the second level are three plan workbook data areas including the project introduction and management structure data 110, the project planning and control data 130, and the project supporting plan data 150. FIG. 2 shows only part of the third level of the hierarchy that may have a number of data fields under the data area project planning and control data 130, such as the WBS 132 and the milestone changes 136 under the project planning and control data 130. At the next level of the hierarchy may be a number of data items under a data field. For example, the milestone changes 136 may include a set of data items 264, including milestone, reason for the change, and impact of the change, among others.

To facilitate the traversal and search for the plan workbook data, the plan workbook system 100 may provide links to traverse from the plan workbook data at one level of the hierarchy to the data at another level. For example, a user may directly go from the project planning and control data 130 to any of the data fields included in the project planning and control data 130. In addition, some links may lead the user to data contents outside the plan wordbook. For example, the data item for the data field WBS 132 may be a web link 262 leading to a web page 268, and the data item milestone under the data field milestone may lead to a file in a database 166.

Figure 6:
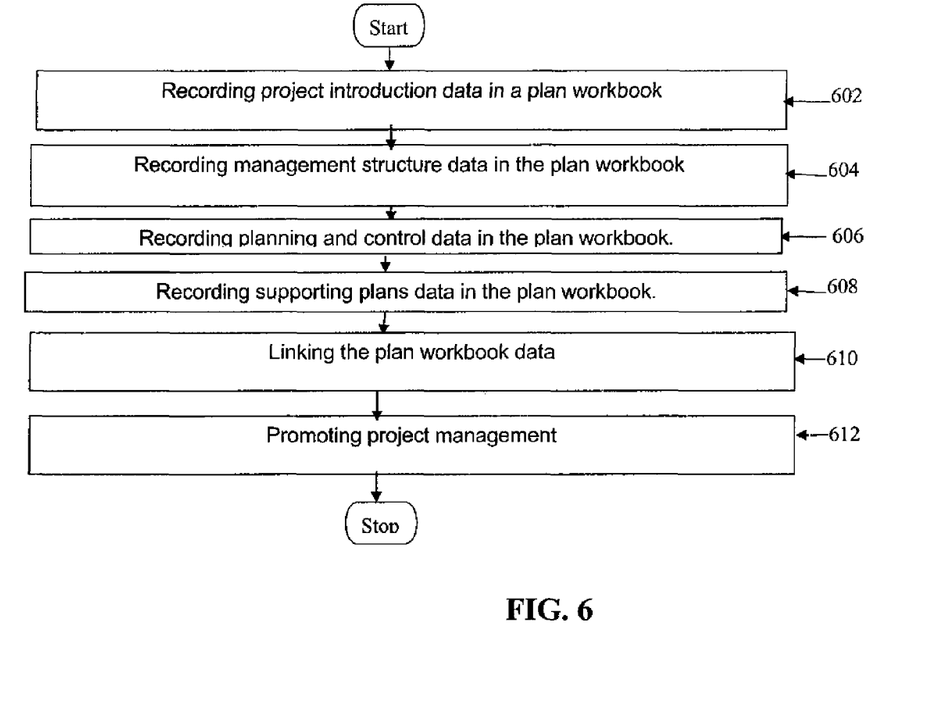
FIG. 6 illustrates a flow chart of a method for plan workbook according to some embodiments of the present disclosure.

FIG. 6 illustrates a flow chart of a method for plan workbook according to some embodiments of the present disclosure. Block 602 shows the step of recording project introduction data in the plan workbook, including recording project charter and scope statement. This step may include manually entering the project introduction data or importing the data into the plan workbook via an application program interface (API). Block 604 shows the step of recording the management structure data in the plan workbook. The management structure data may include the stake holder and core team 114, the RACI 116, the communication plan 118, the assumptions 122, among others. This step may include manually entering the management structure data or importing the management structure data into the plan workbook via an API. This step may take place after the previous step at block 602, because the data field such as the stake holder and core team 114 may depend on the project charter-scope state data 112.

Block 606 shows the step of recording the planning and control data 130 in the plan workbook. The planning and control data 130 may include the WBS 132, the milestone 134, the milestone change 136, and the budget 138, among others. This step may include manually entering the planning and control data 130 or importing the project introduction and management structure data 110 into the plan workbook via an API. This step may take place after the previous step at block 604, because the data field such as the budget 138 may depend on some data fields recorded at the previous step at 604 such as the stake holder and core team data 114.

Block 608 shows the step of recording the project supporting plan data in the plan workbook. The project supporting plan data 150 may include the risk management plan 162, the risk register 164, and the variance report 166, among others. This step may include manually entering the project supporting plan data 150 or importing the project supporting plan data 150 into the plan workbook via an API. This step may take place after the previous step at block 606, because the data field such as the variance report 166 may depend on some of the data fields recorded at the previous step at block 606 such as the WBS 132.

Block 610 shows the step of linking the plan workbook data. This step may involve creating a bidirectional link connecting a first data at one level of the plan workbook hierarchy to a second data at a lower level of the plan workbook hierarchy. For example, the first data may be a data area of the plan workbook such as the project supporting plan data 150, and the second data may be a data field such as the variance report 166 under the supporting plan data 150. The second data may be a data field, or a data item within the plan workbook. This step may also involve creating a unidirectional link to a data content outside the plan workbook. The data content may be a web page, an application program, a file, or a file location outside the plan workbook.

Block 612 shows the step of promoting project management by displaying the plan workbook to multiple parties involved in the project and sharing the plan workbook among the parties. The parties involved in the project may include stake holders, project managers, quality control teams, and development teams, among others. Sharing the plan workbook may involve allowing multiple parties to view the plan workbook at the same time but allowing only one party to modify the plan workbook at a time.

Figure 7:
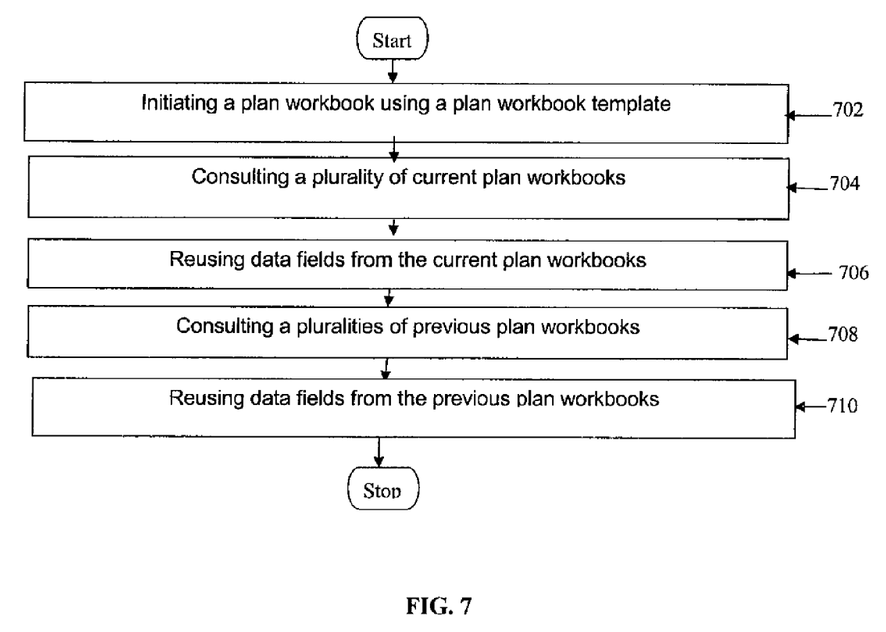
FIG. 7 illustrates a flow chart of a method for using plan workbook for project management according to some embodiments of the present disclosure.

FIG. 7 illustrates a flow chart of a process of using the plan workbook for project management according to some embodiments of the present disclosure. Block 702 shows the step of initiating a plan workbook using a plan workbook template. When a new project is started, the plan workbook for the new project may start from the plan workbook template provided by the plan workbook system 100. The plan workbook template may promote the consistency and uniformity of project management across multiple projects by encouraging the multiple projects to initiate from the same plan workbook template with the same data fields. The plan workbook template may include links between the data fields of the plan workbook, in addition to the data fields as described in FIG. 1 through FIG. 4.

Block 704 shows the step of consulting a number of current plan workbooks. The current plan workbooks for some concurrent and related projects may provide valuable insights and data for this new plan workbook. The data fields in the current plan workbooks for the concurrent projects, such as risk management plans, vendor management plans, quality management plans, assumptions, constraints, communications plans, WBSs, and budget plans, among others may provide references for this new plan workbook. This step may include sub-steps such as searching the current plan workbooks using project related key words and examining the key data fields of the current plan workbooks. The key data fields may have potential to be generalized over multiple projects. These key data fields may include risk management plans, vendor management plans, quality management plans, assumptions, constraints, communication plans, WBSs, and budget plans, among others.

Block 706 shows the step of reusing data fields from the current plan workbooks. When the data in the data fields of the current plan workbooks is found matching the need of the new plan workbook for the new project, the data may be reused in the new plan workbook with or without modification. Block 708 shows the step of consulting a number of previous plan workbooks, similar to the step shown at block 704, but the action of block 708 is directed to the previous plan workbooks for the previous projects as opposed to the current plan workbooks for the concurrent projects. Block 710 shows the step of reusing data fields from the previous plan workbooks and is similar to the step shown at block 706, but the action of block 710 is directed to the previous plan workbooks for the previous projects as opposed to the current plan workbooks for the concurrent projects.

The system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for a plan workbook, comprising:

recording, by a component stored on a non-transitory computer readable medium and executable by a processor, charter-scope data in the plan workbook for a project management;

recording, by the component, management structure data in the plan workbook subsequent to recording the charter-scope data, wherein the management structure data is based on the previously recorded charter-scope data and comprises project management role data that identifies individuals associated with the project management;

recording, by the component, planning and control data in the plan workbook subsequent to recording the management structure data, wherein the planning and control data is based on the previously recorded management structure data and comprise a work breakdown structure (WBS);

recording, by the component, supporting plans data in the plan workbook subsequent to recording the planning and control data, wherein the supporting plans data is based on the previously recorded planning and control data, wherein the supporting plans data comprises risk register data and variance report data;

creating a plurality of unidirectional links and bidirectional links between one or more of data fields including the charter-scope data, the project management role data, the work breakdown structure, the risk register data, and the variance report data to one or more data items included in the data fields within the plan workbook, wherein one or more of the plurality of unidirectional links and bidirectional links causes the project management role data to link to each of functional requirements data, design review data, and gate approval data, wherein one of the plurality of unidirectional links and bidirectional links causes the work breakdown structure to link to a work breakdown tool, wherein one or more of the plurality of unidirectional links and bidirectional links causes the risk register data to link to each of risk description data, root cause data, impact description data, impact severity data, risk probability data, and risk response plan data, and wherein one or more of the plurality of unidirectional links and bidirectional links causes the variance report data to link to each of planned time data, planned cost data, planned status data, actual time data, actual cost data, actual status data, schedule variance data, and cost variance data; and promoting project management by displaying the plan workbook.

2. The computer implemented method of claim 1, wherein the charter-scope data defines objectives for the project and an authorization.

3. The computer implemented method of claim 1, wherein the WBS is a hierarchical decomposition of work to be accomplished and is based on assumptions data, constraints data, and dependencies and synergies data.

4. The computer implemented method of claim 1, wherein the project management role data associates the individuals with at least one of responsible, accountable, consulted, and informed (RACI) roles for one or more project areas comprising functional requirement, design review, and gate approval.

5. The computer implemented method of claim 1, wherein the variance report data comprises plan data, actual data, and comparison data for project time and project cost.

6. The computer implemented method of claim 1, further comprising creating one or more of links to one or more of a web page, a document, a file location, and an application outside the plan workbook.

7. The computer implemented method of claim 1, wherein displaying the plan workbook comprises displaying the plan workbook to one or more of a director, a project manager, a development team member and a stake holder to promote supervision and overview of the project.

8. The computer implemented method of claim 7, wherein promoting project management comprises sharing the plan workbook among the director, the project manager, the development team member, and the stake holder with a version control.

9. A system for a plan workbook, comprising:
a storage device;
a processor;
an input-output device used to record:
charter-scope data in the plan workbook for a project,
management structure data in the plan workbook, wherein the management structure data is recorded subsequent to the charter-scope data, and wherein the management structure data is based on the previously recorded charter-scope data and comprises project management role data that identifies individuals associated with the project management,
planning and control data in the plan workbook, wherein the planning and management structure data is recorded subsequent to the management structure data, and wherein the planning and control data is based on the previously recorded management structure data and comprises a work breakdown structure, and
supporting plans data in the plan workbook, wherein the supporting plans data is recorded subsequent to the planning and control data, wherein the supporting plans data is based on the previously recorded planning and control data and comprises risk register data and variance report data; and instructions stored in the storage device, such that the instructions when executed by the processor are configured to promote project management for the project by displaying the plan workbook, wherein the plan workbook comprises a plurality of unidirectional links and bidirectional links between one or more of data fields including the charter-scope data, the project management role data, the work breakdown structure, the risk register data, and the variance report data to one or more data items included in the data fields, wherein one or more of the plurality of unidirectional links and bidirectional links causes the project management role data to link to each of functional requirements data, design review data, and gate approval data, wherein one of the plurality of unidirectional links and bidirectional links causes the work breakdown structure to link to a work breakdown tool, wherein one or more of the plurality of unidirectional links and bidirectional links causes the risk register data to link to each of risk description data, root cause data, impact description data, impact severity data, risk probability data, and risk response plan data, and wherein one or more of the plurality of unidirectional links and bidirectional links causes the variance report data to link to each of planned time data, planned cost data, planned status data, actual time data, actual cost data, actual status data, schedule variance data, and cost variance data.

10. The system of claim 9, wherein the plan workbook comprises a definition for each type of data to be recorded.

11. The system of claim 9, wherein the plan workbook is implemented as one of a spreadsheet, a JAVA-based application, and a web-based application.

12. The system of claim 9, wherein the management structure data comprises a hierarchy of data with attendance data, communications plan data, assumptions data, constraints data, dependencies and synergies data, and the project management role data in a first level of the hierarchy, wherein the management structure data lists data in an order for implementation, wherein the attendance data comprises data for core team members, sponsors, and vendors in a second level of the hierarchy, and wherein each of the communications plan data, the assumptions data, the constraints data, the dependencies and synergies data, and the project management role data comprises additional data in the second level of the hierarchy.

13. The system of claim 12, wherein the planning and control data further comprises milestones data, milestones change data, budget data, open issues data, closed issues data, open action items data, and closed action items data in the first level of the hierarchy, wherein the planning and control data lists data in an order for implementation, wherein the milestones data comprises project phase data, task data, target start data, target finish data, actual start data, and actual finish data in the second level of the hierarchy, and wherein each of the milestones change data, the budget data, the open issues data, the closed issues data, the open action items data, and the closed action items data comprises additional data in the second level of the hierarchy.

14. The system of claim 13, wherein the supporting plans data further comprises change control data, key documents data, quality management data, launch readiness data, lifecycle management data, vendor management data, and risk management data in the first level of the hierarchy, wherein the supporting plans data lists data in an order for implementation, wherein the vendor management data comprises vendor data, contact data, contract data, and contract deliverables data in the second level of the hierarchy, wherein the quality management data comprises quality management plan data, quality management team data, and quality assurance data in the second level of the hierarchy, and wherein each of the change control data, the key documents data, the launch readiness data, the lifecycle management data, and the risk management data comprises additional data in the second level of the hierarchy.

15. The computer implemented method of claim 1, wherein the work breakdown tool is outside the plan workbook and wherein the work breakdown tool leads a user to a file or an application outside the plan workbook.

16. The computer implemented method of claim 1, wherein the management structure data further comprises attendance data, communications plan data, assumptions data, constraints data, and dependencies and synergies data, and wherein one or more links of the plurality of unidirectional links and bidirectional links causes the attendance data to link to each of team members data, sponsors data, and vendors data.

17. The computer implemented method of claim 16, wherein the planning and control data further comprises milestones data, milestones change data, budget data, open issues data, closed issues data, open action items data, and closed action items data, and wherein one or more links of the plurality of unidirectional links and bidirectional links causes the milestones data to link to each of milestone description data, project phase data, task data, target start data, target finish data, actual start data, and actual finish data.

18. The computer implemented method of claim 17, wherein the supporting plans data further comprises change control data, key documents data, quality management data, launch readiness data, lifecycle management data, vendor management data, and risk management data, wherein one or more links of the plurality of unidirectional links and bidirectional links causes the vendor management data to link to each of vendor data, contact data, contract data, and contract deliverables data, and wherein one or more links of the plurality of unidirectional links and bidirectional links causes the quality management data to link to quality management plan data, quality management team data, and quality assurance data.

19. The system of claim 9, wherein the work breakdown tool is outside the plan workbook and wherein the work breakdown tool leads a user to a file or an application outside the plan workbook.

\* \* \* \* \*